Figure 1:
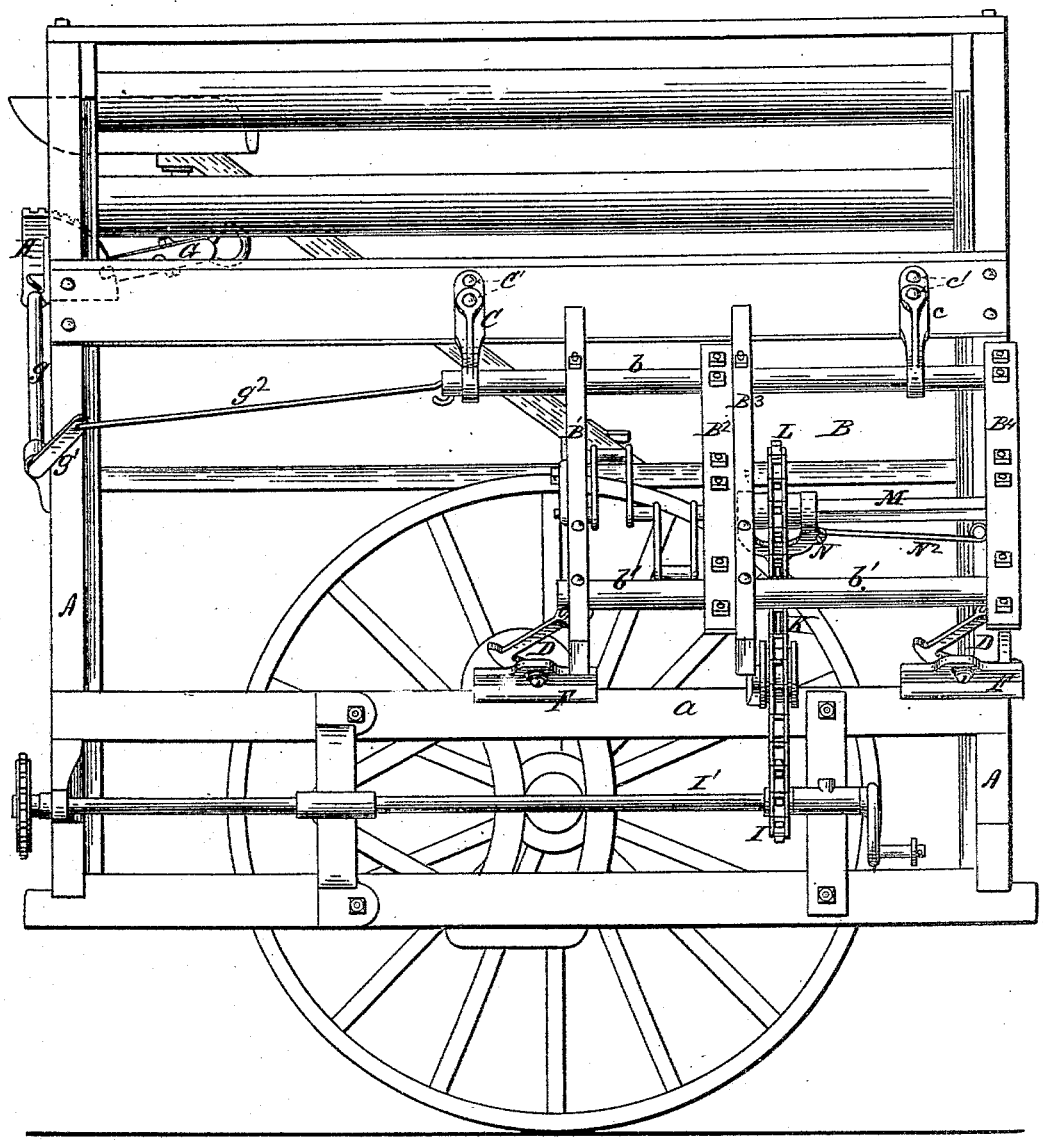

(No Model.)　　　　　J. F. APPLEBY.　　　3 Sheets—Sheet 1.
ADJUSTABLE BINDER FOR HARVESTERS.

No. 315,993.　　　　　　　Patented Apr. 21, 1885.

Witnesses:
M. L. Adams.
L. Smith.

Inventor
John F. Appleby
Per Edw. E. Quimby
Atty.

(No Model.) 3 Sheets—Sheet 2.

J. F. APPLEBY.
ADJUSTABLE BINDER FOR HARVESTERS.

No. 315,993. Patented Apr. 21, 1885.

(No Model.) 3 Sheets—Sheet 3.
J. F. APPLEBY.
ADJUSTABLE BINDER FOR HARVESTERS.
No. 315,993. Patented Apr. 21, 1885.
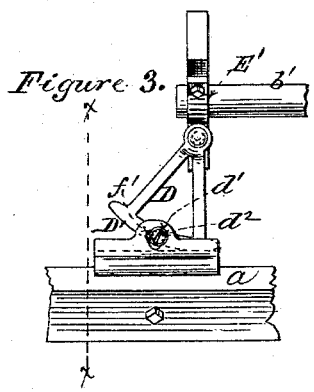
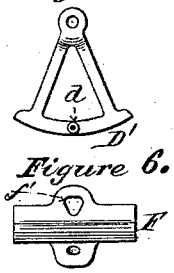
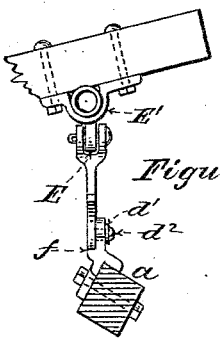
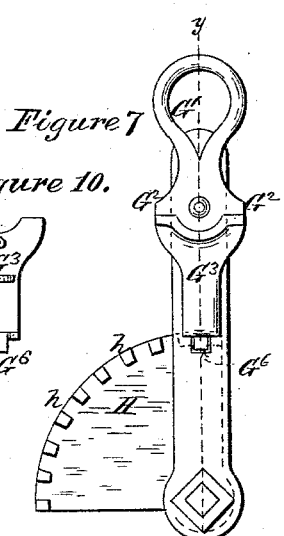
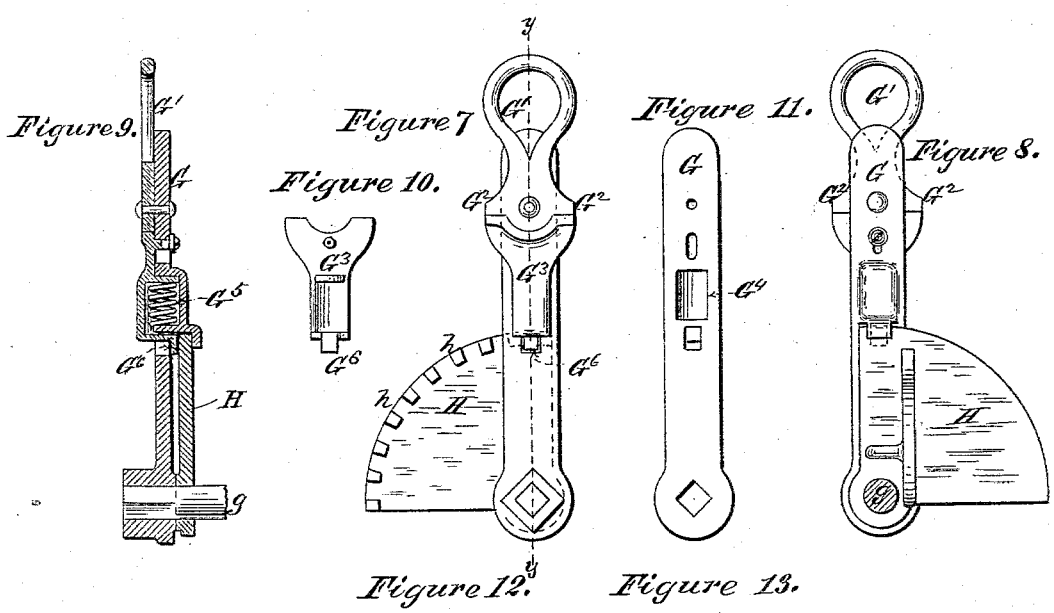
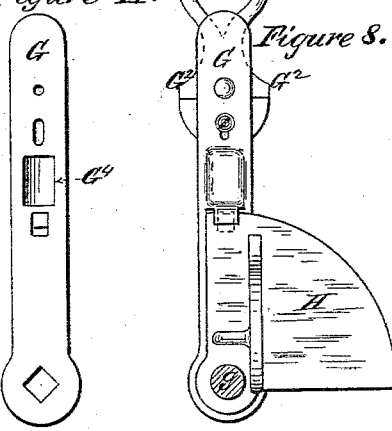
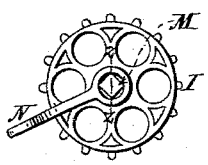
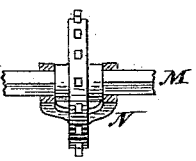
Witnesses:
M. L. Adams.
L. Smith.
Inventor:
John F. Appleby
Per Edw. E. Lumley
Atty.

UNITED STATES PATENT OFFICE.

JOHN F. APPLEBY, OF MINNEAPOLIS, MINNESOTA, ASSIGNOR TO THE MINNEAPOLIS HARVESTER WORKS, OF SAME PLACE.

ADJUSTABLE BINDER FOR HARVESTERS.

SPECIFICATION forming part of Letters Patent No. 315,993, dated April 21, 1885.

Application filed December 29, 1883. (No model.)

*To all whom it may concern:*

Be it known that I, JOHN F. APPLEBY, of Minneapolis, Minnesota, have invented a certain Improvement in Adjustable Binders for Harvesters, of which the following is a specification.

My invention relates to a method of supporting and adjusting upon a self-binding harvester the bed-frame upon which the mechanism for packing and binding is erected; and it consists in suspending the bed-frame of the binding mechanism in an inclined position from eyes fastened to the upper part of the main frame of the harvester, through which eyes the upper horizontal supporting-bar of the bed-frame is adapted to slide, and in supporting the lower part of the bed-frame upon rockers pivoted to the bed-frame and having their rolling tread upon a lower part of the main frame of the harvester. The upper horizontal supporting-rod of the bed-frame is linked to the crank of a rock-shaft provided with an actuating radius-bar within convenient reach from the driver's seat. This radius-bar is provided with a longitudinally-sliding latch, the laterally-projecting end of which is adapted to engage the spaces between the teeth of the curved rack which is affixed to the frame of the harvester.

A part of my invention consists in pivoting to the side of the radius-bar near its free end a double wiper-cam, which bears upon the end of the retaining-pawl, and which is provided with a crank-arm terminating in a handle adapted to be conveniently grasped by the hand of the driver. By means of these devices force applied in either direction to the handle of the wiper-cam, by rocking either one or the other of the wipers, depresses the retaining-pawl and disengages it from the rack, and thus frees the radius-bar, so that it can be moved in either direction according to the direction in which it is desired to move the binding mechanism. The retaining-pawl is a spring-latch, which engages one or the other of the spaces between the teeth of the stationary rack, according to the position to which the radius-bar is moved, and thus locks the radius-bar and holds the binding mechanism in the position to which it may have been adjusted.

Figure 2:
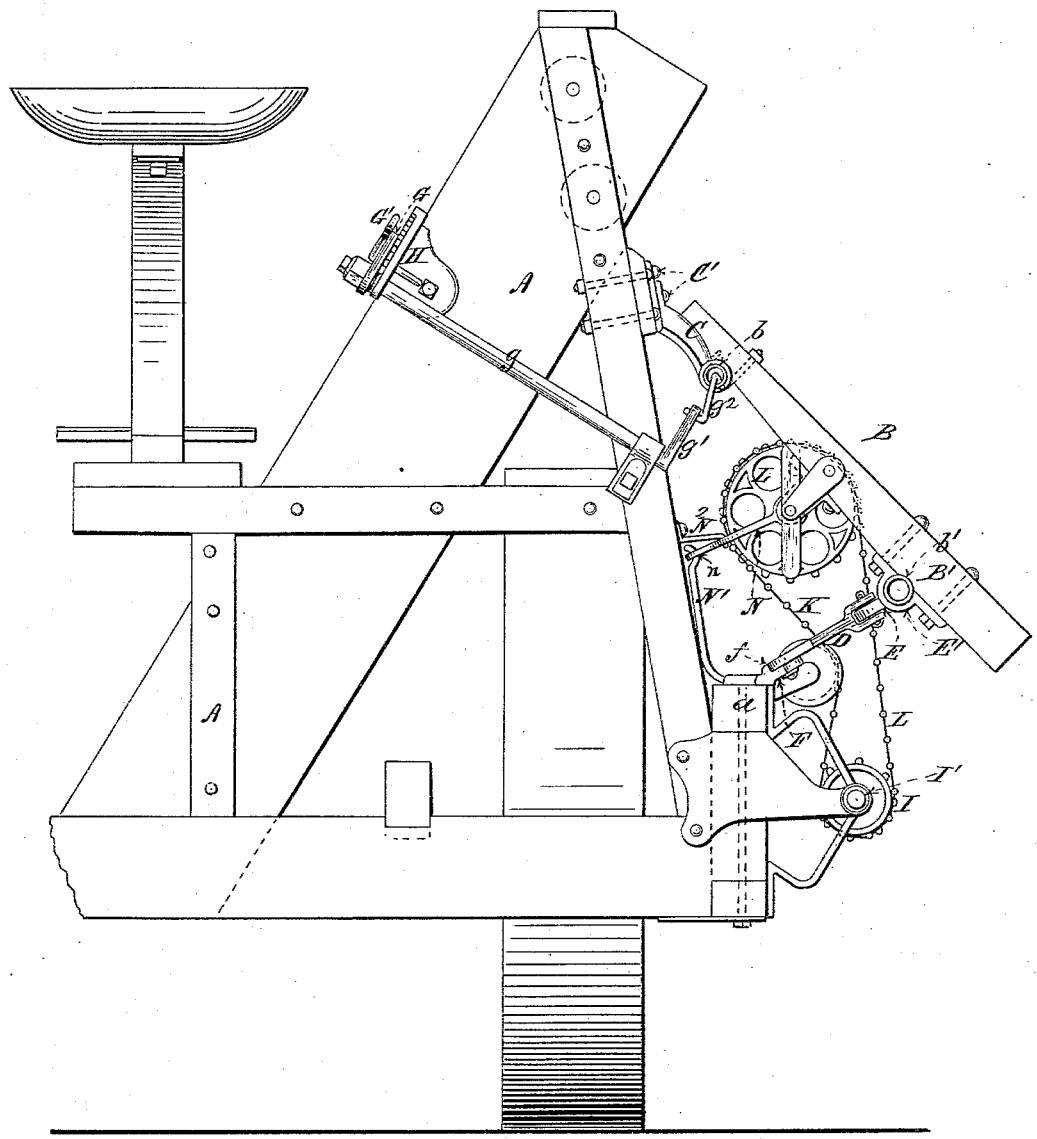

The accompanying drawings, representing a portion of a harvester and the bed-frame upon which the binding mechanism is erected, are as follows: Figure 1 is an elevation of the drive-wheel side of the machine. Fig. 2 is a rear elevation of the harvester-frame and bed-frame of the binder. Fig. 3 is a view of the inclined under side of one of the rockers and the adjacent parts of the machine. Fig. 4 is a transverse section through the line X X on Fig. 3. Fig. 5 is an elevation of one of the rockers. Fig. 6 is a detached view of one of the tracks for receiving the treads of the rockers. Figs. 7 and 8 are elevations showing opposite sides of the radius-bar for adjusting the binder-frame and opposite sides of the quadrantal rack. Fig. 9 is a longitudinal section of the radius-bar and rack, taken through the line Y Y on Fig. 7. Fig. 10 is a detached view of the retaining-pawl. Fig. 11 is a detached view of the radius-bar with the retaining-pawl and the hand-piece removed. Fig. 12 is an elevation of the sprocket-wheel by which motion is given to the main shaft of the binding mechanism, showing the edge of the yoke by which the sprocket-wheel is maintained in proper vertical alignment while the main shaft of the binding mechanism slides through it. Fig. 13 is a view of the edge of the sprocket-wheel, showing a portion of the square shaft upon which it is loosely mounted, and showing the hubs of the yoke in section through the line Z Z on Fig. 12.

The drawings represent a portion of the main frame A of a harvester of the class in which the grain is elevated and carried over the drive-wheel and the binding operation is performed outside the drive-wheel.

The bed-frame B, upon which the binding mechanism is erected, is composed of any suitable number of inclined timbers and any suitable number of horizontal timbers. The frame shown in the drawings has four inclined timbers, B' B² B³ B⁴, which are secured by suitable clamps to two tubular horizontal supporting-rods, $b$ $b'$. The upper horizontal rod, $b$, is considerably longer than the lower horizontal rod, $b'$, and is inserted through the eyes C $c$, which are secured by the bolts C' and $c'$ to the upper part of the main frame of the harvester. The bed-frame is sustained in a suitably-inclined position by means of the rockers D D, which are pivoted, respectively, to the ears E E, cast upon the clamps E' E', by which the lower horizontal rod, $b$, of the bed-frame is secured to the inclined rods B' B⁴ of the bed-frame. The curved faces D' D' of the rockers respectively are arcs of circles to provide for the desired range of horizontal fore-and-aft adjustment of the bed-frame. Straight tracks to receive the treads of the rockers are formed, respectively, upon the surface of the metallic angle-pieces F F, which are bolted to the horizontal timber $a$ of the main harvester-frame. The angle-pieces are each provided with the inclined ledge $f$, upon the upper inclined side of which the rockers respectively rest. Each rocker is provided upon its under side with the laterally-projecting boss $d$, which projects through a triangular slot, $f'$, formed in the ledge $f$. The slots $f'$ are each wider at the top than at the bottom, to provide for the movement of the boss $d$ in curved paths during the rolling movement of the rockers in opposite directions. The rockers are held against the upper sides of the ears $f$, and are thus kept on their tracks respectively by means of washers affixed to the ends of the bosses $d$ and bearing upon the under sides of the ears $f$. Each of these washers $d'$ is fastened to its boss $d$ by a screw, $d^2$. By this organization very little friction attends the adjusting movement of the bed-frame. Power to effect this movement is applied by means of the radius-bar G, which is pivoted to the main frame of the binder within convenient reach from the driver's seat, and which is affixed to the rock-shaft $g$, provided with the crank $g'$, which is connected by means of the link or pitman $g^2$ with the end of the parallel horizontal supporting-rod $b$ of the bed-frame. The radius-bar moves in a plane parallel with the face of the quadrantal rack H, which is fastened to the main frame of the binder, and which is provided with the laterally-projecting teeth $h$. The upper end of the radius-bar is provided with a pivoted hand-piece, G', the hub of which has upon its opposite sides, respectively, the laterally-projecting shoulders or wipers G² G², which bear upon the upper end of the retaining pawl-piece G³, which is adapted to slide in a groove, G⁴, formed in the radius-bar, and which is held against the wipers by the expanding-spring G⁵. The retaining-pawl is provided with the laterally-projecting tooth G⁶, which is adapted to enter the spaces between the teeth $h$ of the quadrantal rack, and when thus entered serves to hold the radius-bar stationary.

When force is applied in either direction to the hand-piece of the radius-bar, the first effect is to thrust the retaining-pawl G³ radially inward, thus disengaging the tooth G⁶ from the quadrantal rack. The next effect is to swing the radius-bar, and thus turn the rock-shaft $d$, from which, by means of the crank $g'$ and pitman $g^2$, motion is communicated to the bed-frame of the binding mechanism. When the bed-frame has been moved to the desired position, the operator lets go of the radius-bar, and the expanding-spring G⁵ thrusts the retaining-pawl radially outward, and thus carries the tooth G⁶ into one of the spaces between the teeth $h$ of the quadrantal rack. If the position in which the radius-bar is left is such that the tooth G⁶ bears upon the under side of one of the teeth of the rack H, the jarring incident to the working of the machine will cause the radius-bar to move in one direction or the other sufficiently to dislodge the tooth G⁶ and permit it to enter one or the other of the spaces adjoining the tooth against which it was caught. Owing to the comparatively small size of the teeth on the rack and the length of the radius-bar, the range of such possible movement of the radius-bar will be too small to materially affect the position of the bed-frame.

Power to drive the binding mechanism is transmitted from the sprocket-wheel I, affixed to the counter-shaft I', having its bearings in the main frame of the harvester, by means of the chain K, to the sprocket-wheel L, through the hub of which the main shaft M of the binding mechanism is adapted to slide.

The sprocket-wheel L is preserved in vertical alignment with the sprocket-wheel L by means of the yoke N, the arms of which loosely embrace the shaft M on opposite sides, respectively, of the hub of the sprocket-wheel L. The yoke N is held in position by means of the stay-rod N', which hooks into the eye $n$ in the bight of the yoke, and is affixed to the horizontal timber $a$ of the main frame of the harvester, and by the stay-rod N², extending from the side of the yoke to the side of the main frame of the harvester.

In the drawings the portion of the shaft M which slides through the sprocket-wheel L is represented as square, and the hub of the sprocket-wheel L has a correspondingly square hole in it.

I claim as my invention—

1. The combination, in a self-binding harvester, of an inclined bed-frame for supporting the binding mechanism, suspended from the main frame by means of a horizontal bar and eyes through which the said bar is inserted, rockers pivoted to the under inclined sides of the said bed-frame and serving to hold the same at the proper angle of inclination, suitable tracks formed in or upon a portion of the main frame of the harvester and affording the bearings for the curved faces of the said rockers, respectively, ears provided with suitably-formed slots and projecting from the said tracks in inclined planes parallel with and affording bearings for the inclined sides of the said rockers, bosses affixed to and projecting from the sides of the rockers into the said slots, and means for adjusting the position of the frame supporting the binding mechanism in the direction of the length of the grain delivered from the harvester.

2. In a self-binding harvester, a rock-shaft connected by means of a crank and pitman with the sliding frame upon which the binding mechanism is erected, and also connected with a radius-bar provided with a movable retaining-pawl, and with a double wiper-cam having a hand-piece to which force can be applied in either direction for the purpose of moving the retaining-pawl radially inward, in combination with a curved rack, substantially such as described, affixed to the main frame of the harvester, as and for the purposes set forth.

3. The rockers D D, pivoted to the bed-frame of the binding mechanism, and provided, respectively, with the laterally-projecting bosses $d$, having the washers $d'$ affixed to their outer ends, in combination with the inclined ledges $f$, provided with the triangular slots $f'$, as and for the purposes set forth.

JOHN F. APPLEBY.

Witnesses:
C. M. CASTLE,
HENRY HONKOMP.